United States Patent
Nagata (10) Patent No.: US 9,792,068 B2
(45) Date of Patent: Oct. 17, 2017

(54) MEMORY SYSTEM AND METHOD OF CONTROLLING NONVOLATILE MEMORY

(71) Applicant: Toshiba Memory Corporation, Minato-ku (JP)

(72) Inventor: Yuki Nagata, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/052,995

(22) Filed: Feb. 25, 2016

(65) Prior Publication Data

US 2017/0075580 A1     Mar. 16, 2017

Related U.S. Application Data (60) Provisional application No. 62/216,837, filed on Sep. 10, 2015.

(51) Int. Cl.
*G06F 3/06*     (2006.01)

(52) U.S. Cl.
CPC ............ *G06F 3/064* (2013.01); *G06F 3/0608* (2013.01); *G06F 3/0652* (2013.01); *G06F 3/0659* (2013.01); *G06F 3/0679* (2013.01)

(58) Field of Classification Search
CPC ...... G06F 3/064; G06F 3/0608; G06F 3/0652; G06F 3/0659; G06F 3/0679
See application file for complete search history.

(56) References Cited

U.S. PATENT DOCUMENTS

| | | | |
|---|---|---|---|
| 8,886,691 B2 | 11/2014 | Colgrove et al. | |
| 2008/0294814 A1* | 11/2008 | Gorobets | G11C 16/349 710/62 |
| 2009/0327591 A1* | 12/2009 | Moshayedi | G06F 11/1441 711/103 |
| 2011/0055455 A1* | 3/2011 | Post | G06F 12/0246 711/103 |
| 2012/0117406 A1* | 5/2012 | Eun | H04W 52/0216 713/323 |
| 2012/0151124 A1* | 6/2012 | Baek | G06F 12/0246 711/103 |
| 2013/0138912 A1* | 5/2013 | Bux | G06F 12/0646 711/170 |
| 2014/0215129 A1 | 7/2014 | Kuzmin et al. | |

FOREIGN PATENT DOCUMENTS

JP     2012-128900     7/2012

* cited by examiner

*Primary Examiner* — Douglas King
(74) *Attorney, Agent, or Firm* — Oblon, McClelland, Maier & Neustadt, L.L.P.

(57) ABSTRACT

According to one embodiment, when a first command and first data are received from a host, and in a case where the number of free blocks is less than a first threshold, a controller executes a first processing. The first processing includes reading valid data included in one first block that includes the valid data and invalid data and writing the read valid data and at least a part of write data specified by the write command into the free block.

20 Claims, 6 Drawing Sheets

MEMORY SYSTEM AND METHOD OF CONTROLLING NONVOLATILE MEMORY

CROSS-REFERENCE TO RELATED APPLICATIONS

This application is based upon and claims the benefit of priority from U.S. Provisional Application No. 62/216,837, filed on Sep. 10, 2015; the entire contents of which are incorporated herein by reference.

FIELD

Embodiments described herein relate generally to a memory system including a nonvolatile memory and a method of controlling a nonvolatile memory.

BACKGROUND

A memory system including a flash memory executes garbage collection. The garbage collection is a process in which valid data is collected from a first block in which invalid data is included and the collected valid data is rewritten into a second block.

DETAILED DESCRIPTION

According to one embodiment, a memory system includes a nonvolatile memory and a controller. The nonvolatile memory includes a plurality of blocks. When a first command and first data are received from a host, and in a case where the number of free blocks is less than a first threshold, the controller executes a first processing. The first command is a write command. The first data is write data specified by a write command. The first processing includes reading valid data included in one first block among the plurality of blocks and writing the read valid data and at least a part of the first data into the free block. The free block does not include valid data. The first block includes valid data and invalid data.

Exemplary embodiments of memory systems and methods of controlling a nonvolatile memory will be described below in detail with reference to the accompanying drawings. The present invention is not limited to the following embodiments.

Embodiment

Figure 1:
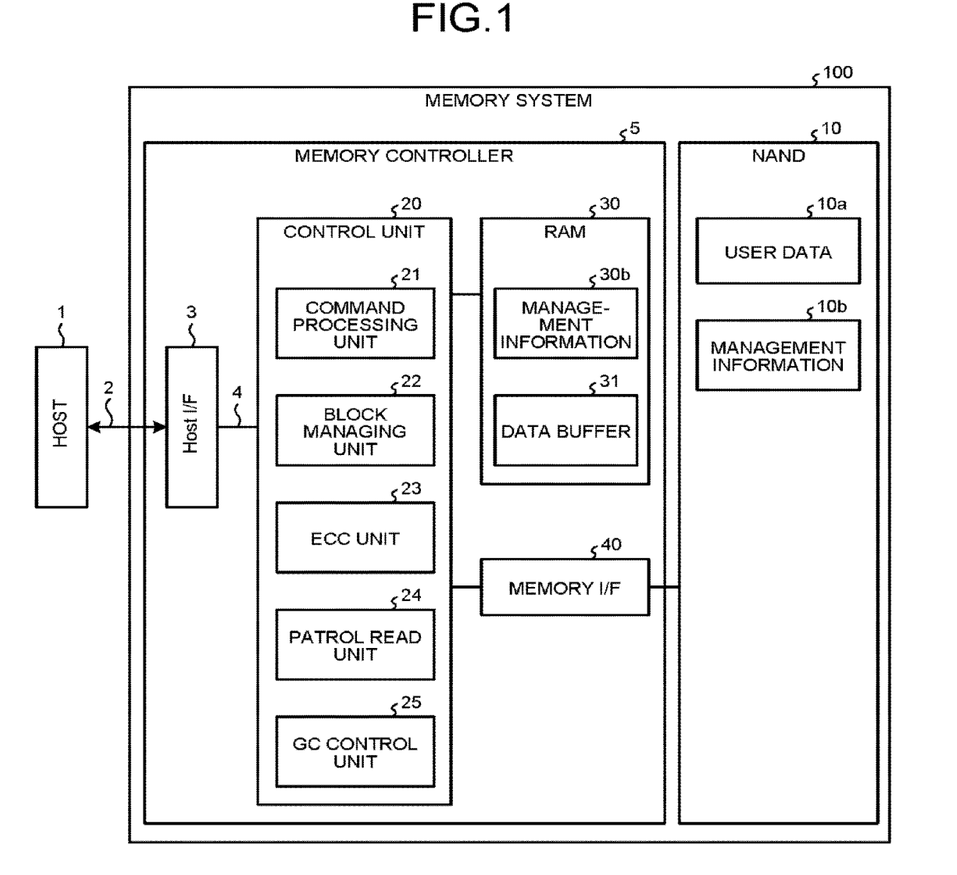
FIG. 1 is a functional block diagram that illustrates an example of the internal configuration of a memory system.

FIG. 1 is a block diagram that illustrates an example of the configuration of a memory system 100 according to an embodiment. The memory system 100 is connected to a host apparatus 1 (hereinafter, abbreviated as a host) through a communication line 2 and functions as an external storage device of the host 1. The host 1, for example, may be an information processing apparatus such as a personal computer, a mobile phone, or an imaging apparatus, and also may be a mobile terminal such as a tablet computer or a smart phone, a gaming device, or an in-vehicle terminal such as a car navigation system.

The memory system 100, for example, is a solid state drive (SSD). The memory system 100 includes: a NAND flash memory (hereinafter, abbreviated as a NAND) 10 as a nonvolatile memory; and a memory controller 5. The nonvolatile memory is not limited to the NAND flash memory but may be a flash memory having a three-dimensional structure, a resistance random access memory (ReRAM), a ferroelectric random access memory (FeRAM), or the like.

The NAND 10 includes one or more memory chips each including a memory cell array. The memory cell array includes a plurality of memory cells arranged in a matrix pattern. The memory cell array includes a plurality of blocks that are units for data erasing. Each block is configured by a plurality of physical sectors MS (see FIG. 2).

Figure 2:
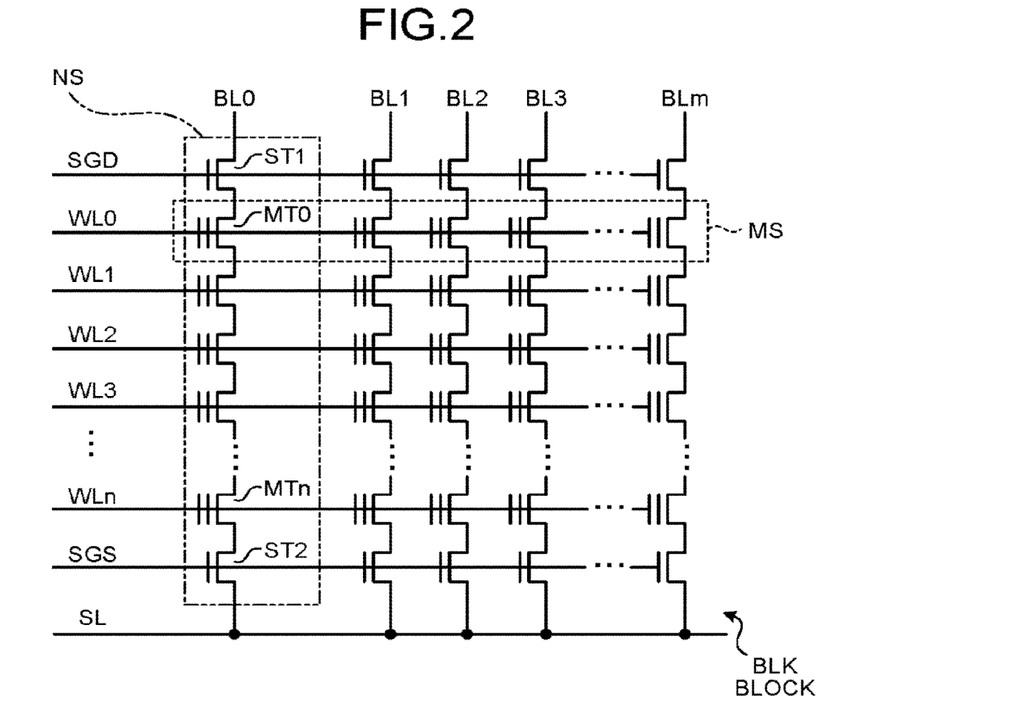
FIG. 2 is a diagram that illustrates an example of the circuit configuration of a memory cell array.

FIG. 2 is a diagram that illustrates an example of the configuration of a block of the memory cell array. FIG. 2 illustrates one of a plurality of blocks that configure the memory cell array. The other blocks of the memory cell array have the same configuration as that illustrated in FIG. 2. As illustrated in FIG. 2, the block BLK of the memory cell array includes (m+1) (here, m is an integer of zero or more) NAND strings NS. Each NAND string NS includes: (n+1) (here, n is an integer of zero or more) memory cell transistors MT0 to MTn that share a diffusion region (a source region or a drain region) and are connected in series between memory cell transistors MT adjacent to each other; and selection transistors ST1 and ST2 that are arranged at both ends of the column of the (n+1) memory cell transistors MT0 to MTn.

Word lines WL0 to WLn are respectively connected to control gate electrodes of the memory cell transistors MT0 to MTn that configure the NAND string NS, and memory cell transistors MTi (here, i=0 to n) included in each NAND string NS are connected to be common using the same word line WLi (here, i=0 to n). In other words, the control gate electrodes of the memory cell transistors MTi disposed in the same row within the block BLK are connected to the same word line WLi.

Each of the memory cell transistors MT0 to MTn is configured by a field effect transistor having a stacked gate structure formed on a semiconductor substrate. Here, the stacked gate structure includes: a charge storage layer (floating gate electrode) formed on the semiconductor substrate with a gate insulating film being interposed therebetween; and a control gate electrode formed on the charge storage layer with an inter-gate insulating film being interposed therebetween. A threshold voltage of each of the memory cell transistors MT0 to MTn changes according to the number of electrons storable in the floating gate electrode and thus, can store data according to a difference in the threshold voltage.

Bit lines BL0 to BLm are respectively connected to the drains of (m+1) selection transistors ST1 within one block BLK, and a selection gate line SGD is connected to be common to the gates of the selection transistors. In addition, the source of the selection transistor ST1 is connected to the drain of the memory cell transistor MT0. Similarly, a source line SL is connected to be common to the sources of the (m+1) selection transistors ST2 within one block BLK, and a selection gate line SGS is connected to be common to the gates of the selection transistors. In addition, the drain of the selection transistor ST2 is connected to the source of the memory cell transistor MTn.

Each memory cell is connected not only to the word line but also to the bit line. Each memory cell can be identified by using an address used for identifying a word line and an address used for identifying a bit line. As described above, the data of a plurality of memory cells (the memory cell transistors MT) disposed within the same block BLK is erased altogether. On the other hand, data is written and read in units of physical sectors MS. One physical sector MS includes a plurality of memory cells connected to one word line.

Each memory cell can perform multi-value storage. In a case where the memory cells are operated in a single level cell (SLC) mode, one physical sector MS corresponds to one page. On the other hand, in a case where the memory cells are operated in a multiple level cell (MLC) mode, one physical sector MS corresponds to N pages (here, N is a natural number of two or more). The pages are units for data writing and data reading.

In a reading operation and a programming operation, one word line is selected according to the physical address, and one physical sector MS is selected. A switching of the page within this physical sector MS is performed using the physical address.

User data 10a transmitted from the host 1, management information 10b and firmware (not illustrated in the drawing) of the memory system 100, and the like are stored in the NAND 10. The firmware operates a CPU (not illustrated in the drawing) realizing at least some of the functions of a control unit 20 of the memory controller 5 to be described later. The firmware described above may be stored in a ROM not illustrated in the drawing. The management information 10b described above includes a logical/physical translation table, a block management table, and the like.

The memory controller 5 includes: a host interface 3; a memory interface 40; a RAM 30, and a control unit 20. In this embodiment, while the RAM 30 is arranged inside the memory controller 5, the RAM 30 may be disposed outside the memory controller 5. The host I/F 3 outputs a command, user data (write data), and the like received from the host 1 to an internal bus 4. In addition, the host I/F 3 transmits user data read from the NAND 10, a response from the control unit 20, and the like to the host 1. The memory I/F 40 directly controls the NAND 10 based on an instruction from the control unit 20.

The RAM 30 is a volatile semiconductor memory that can be accessed at a speed higher than that of the NAND 10. The RAM 30 includes a storage area as a data buffer 31. Data received from the host 1 is temporarily stored in the data buffer 31 before being written into the NAND 10. Data read from the NAND 10 is temporarily stored in the data buffer 31 before the transmission thereof to the host 1. The management information 10b stored in the NAND 10 is loaded into the RAM 30. Management information 30b loaded into the RAM 30 is backed up in the NAND 10. The RAM 30 functions also as a buffer in which firmware stored in the NAND 10 is loaded. As the RAM 30, a static random access memory (SRAM) or a dynamic random access memory (DRAM) is used.

The control unit 20 includes: a command processing unit 21; a block managing unit 22; an ECC unit 23; a patrol read unit 24; and a garbage collection (GC) control unit 25. The function of the control unit 20 is realized by one or a plurality of CPUs (processors) executing the firmware loaded in the RAM 30 and peripheral circuits thereof. The function of the command processing unit 21 is realized by the CPU and/or hardware executing the firmware. The function of the block managing unit 22 is realized by the CPU and/or hardware executing the firmware. The function of the ECC unit 23 is realized by the CPU and/or hardware executing the firmware. The function of the patrol read unit 24 is realized by the CPU and/or hardware executing the firmware. The function of the garbage collection (GC) control unit 25 is realized by the CPU and/or hardware executing the firmware.

The command processing unit 21 executes a process according to a command received from the host 1. For example, in a case where a write request is received from the host 1, the command processing unit 21 temporarily stores write data into the data buffer 31. For example, when the data buffer 31 is full, the command processing unit 21 reads data stored in the data buffer and writes the read data into the NAND 10 through the ECC unit 23 and the memory I/F 40.

In addition, in a case where a read request is received from the host 1, the command processing unit 21 instructs the memory I/F 40 to read data from the NAND 10. The memory I/F 40 temporarily stores the data read from the NAND 10 into the data buffer 31 through the ECC unit 23. The command processing unit 21 transmits the read data stored in the data buffer 31 to the host 1 through the host I/F 3.

The command processing unit 21 manages the user data by using the logical/physical translation table that is one of the above-described management information 30b loaded in the RAM 30. Mapping associating a logical address specified by the host 1 and a physical address of the RAM 30 or the NAND 10 with each other is registered in the logical/physical translation table. For the logical address, for example, logical block addressing (LBA) is used. The physical address represents a storage position on the RAM 30 or the NAND 10 in which data is stored.

The block managing unit 22 manages blocks included in the NAND 10 by using the block management table that is one of the above-described management information 30b loaded in the RAM 30. In the block management table, for example, the following block management information is managed.

The number of times of erasing data in units of blocks

Information identifying whether a block is an active block or a free block

Block address of a bad block

An active block is a block in which valid data is recorded. A free block is a block in which valid data is not recorded. The free block, after data recorded therein is erased, can be reused as an erased block. In description presented here, the term "free block" includes both a block before erasing in which valid data is not recorded and an erased block. The valid data is data that is associated with a logical address, and invalid data is data that is not associated with a logical address. When data is written into the erased block, the block becomes an active block. A bad block is an unusable block that does not normally operate due to various factors.

The ECC unit 23 executes an error correction coding process for data transmitted from the data buffer 31, thereby generating a parity. The ECC unit 23 outputs a code word including the data and the parity to the memory I/F 40. The memory I/F 40 inputs a code word read from the NAND 10 to the ECC unit 23. The ECC unit 23 executes an error correction decoding process by using the input code word and transmits decoded data to the data buffer 31.

The patrol read unit 24 executes patrol read. The patrol read is a process in which data stored in the NAND 10 is read for each certain unit, and the read data is tested based on an error correction result acquired by the ECC unit 23 for detecting a block in which the number of errors increases. In this test process, the number of error bits of the read data is compared with a threshold, and data of which the number of error bits exceeds the threshold is set as a target for refreshing. In the refreshing process, data (data of which the number of error bits exceeds the threshold) stored in a block that is a movement source is moved to an erased block that is a movement destination. In the patrol read described above, during one certain cycle time determined in advance, data is read from all the areas of the NAND 10 and is tested.

The GC control unit 25 controls garbage collection (compaction). In the memory system 100, in a case where a unit (block) for erasing data and a unit for reading/writing data are different from each other, when a rewriting process for the NAND 10 progresses, blocks are fragmented due to invalid data. When the number of such fragmented blocks increases, the number of usable blocks decreases. Thus, for example, in a case where the number of free blocks of the NAND 10 is less than a certain threshold, the garbage collection (compaction) is executed, whereby the number of free blocks is increased. In the garbage collection, valid data is collected from blocks (GC source blocks) in which the valid data and invalid data are included and is rewritten into another block (GC destination block). Hereinafter, the garbage collection will be abbreviated as GC.

The GC is a background job that is independently executed by the memory system 100 that is one of devices connected to the host 1, and host 1 is not involved in that operation. For this reason, there is a possibility of disturbing efficient GC control. In addition, when a command (a write command, a read command, or the like) from the host and the GC are overlapped, there is a possibility that the performance expected from the host is not satisfied. Thus, technologies for enabling a host to instruct a device of the start and the end of GC have been developed.

Figure 3:
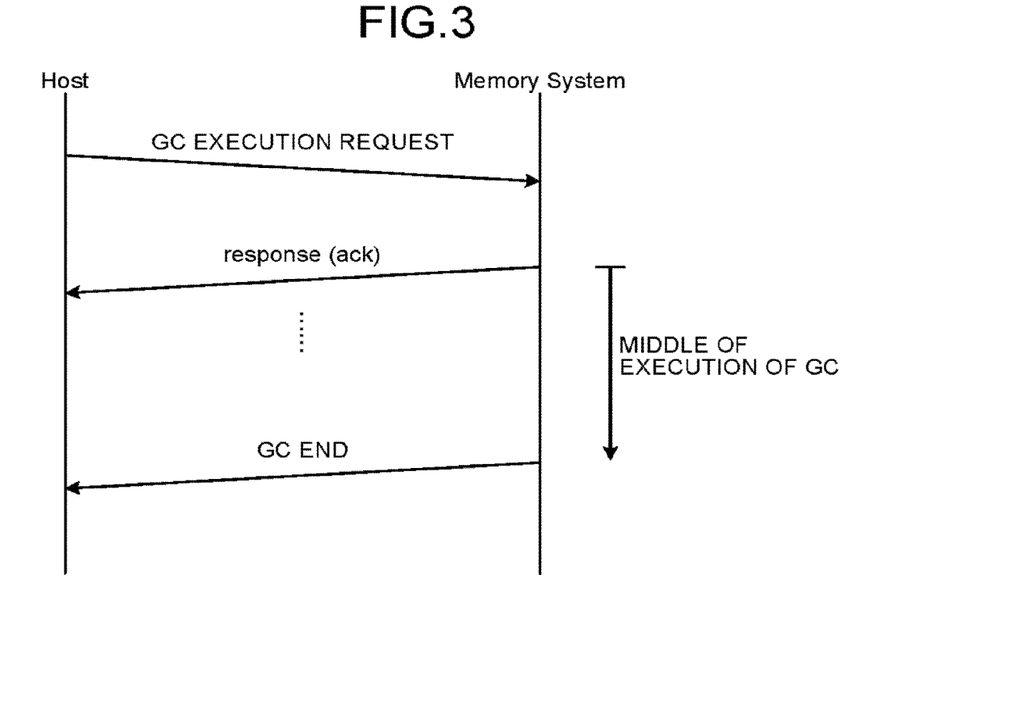
FIG. 3 is a diagram that illustrates an example of a communication protocol between a host and a memory system.

In such technologies, for example, in a case where the number of free blocks is less than a certain threshold, the memory system notifies the host that the number of free blocks is less than the certain threshold. FIG. 3 is a diagram that illustrates an example of a communication protocol between the host 1 and the memory system 100 in the technologies described above. When such a notification is received from the memory system, the host transmits a GC execution request including a target number of required free blocks to the memory system. In addition, in a certain time zone such as a night time zone, the host can transmit a GC execution request including the target number of required free blocks to the memory system. In response to the GC execution request, the memory system transmits a response representing an acknowledgement to the host, thereby executing GC. When the target number of free blocks is secured, the memory system transmits a response representing the end of the GC to the host. In addition, in a case where the target number of free blocks cannot be secured even when a certain time elapses after the start of the GC, when the certain time elapses, the memory system ends the GC and transmits a response representing the end of the GC to the host.

In such technologies, there are cases where the memory system independently starts GC. In other words, when free blocks of a minimum number required for a normal function as a storage cannot be secured inside the NAND 10, the memory system independently starts GC without waiting for a GC execution request from the host 1.

When the GC is executed in accordance with an instruction from the host 1, it is preferable free blocks corresponding to a number requested from the host 1 are efficiently secured, and the degree of wear of the NAND 10 is low as possibly as can. On the other hand, a case where the memory system independently executes GC includes a case where a minimum number of free blocks cannot be secured inside the NAND 10 at the time of reception of a write request from the host 1. In this case, priority is given to the reduction of latency, it is required to rapidly write data requested to be written and to constantly secure free blocks of the minimum number.

Thus, in the embodiment, at the time of reception of a write request from the host 1, when the memory system independently executes GC, special GC of an urgent time is executed. This special GC of an urgent time will be referred as urgent GC. In the urgent GC, all the valid data stored in the GC source block is read, and the read data is directly written into the GC destination block. In addition, write data specified by the write request is written into an area, which is in an erased state, disposed inside the GC destination block, in other words, a remaining area excluding an area in which valid data is stored inside the GC destination block. In this way, in the urgent GC, all the valid data stored in one GC source block and the write data specified by the write request are written into the GC destination block. In other words, in the urgent GC, for a GC destination block, unlike normal GC, valid data stored inside a plurality of GC source blocks is not collected to be written. In the urgent GC, for the GC destination block, unlike the normal GC, valid data is not read from a plurality of GC source blocks, and accordingly, the process can be executed more quickly than the normal GC. In addition, in the urgent GC, when the movement of valid data from one GC source block to a GC destination block is completed, in place of the GC destination block, the GC source block is released to be a free block. For this reason, the write data specified by a write request can be written while a constant number of free blocks are constantly secured.

Figure 4:
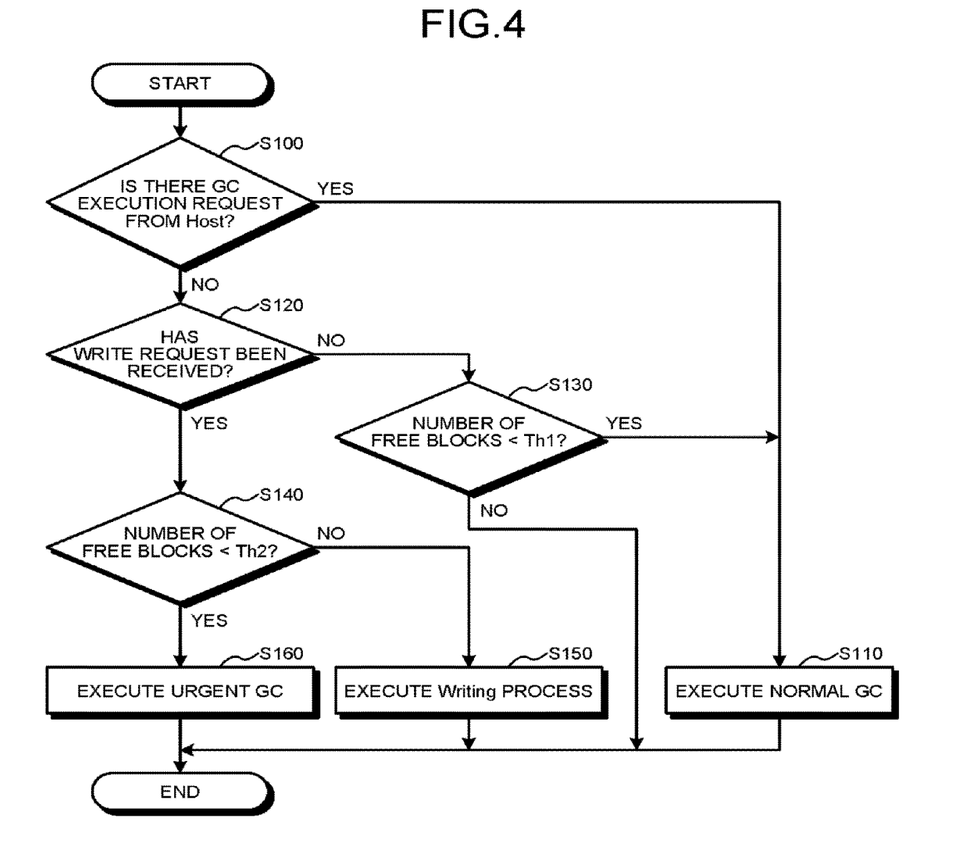
FIG. 4 is a flowchart that illustrates the processing sequence of garbage collection.

FIG. 4 is a flowchart that illustrates an example of the processing sequence executed by the GC control unit 25. When the GC execution request is received from the host 1 (Step S100 Yes), the GC control unit 25 executes normal GC (Step S110). In the normal GC, in order to efficiently secure the number of free blocks that is requested from the host 1 and set the degree of wear of the NAND to be low as possibly as can, it is preferable that a block having a low content ratio of valid data is selected as a GC source block. A block having a low content rate of valid data is a block in which the number of units of valid data stored inside the block is less than a certain threshold. For this reason, in the normal GC, valid data of a block of which the ratio of the valid data is less than a threshold is selected having a higher priority than valid data of a block of which the ratio of the valid data is higher than the threshold. Then, in the normal GC, at least two GC source blocks are selected, valid data is read from the at least two GC source blocks that have been selected, and the read valid data is written into a GC destination block.

Figure 5:
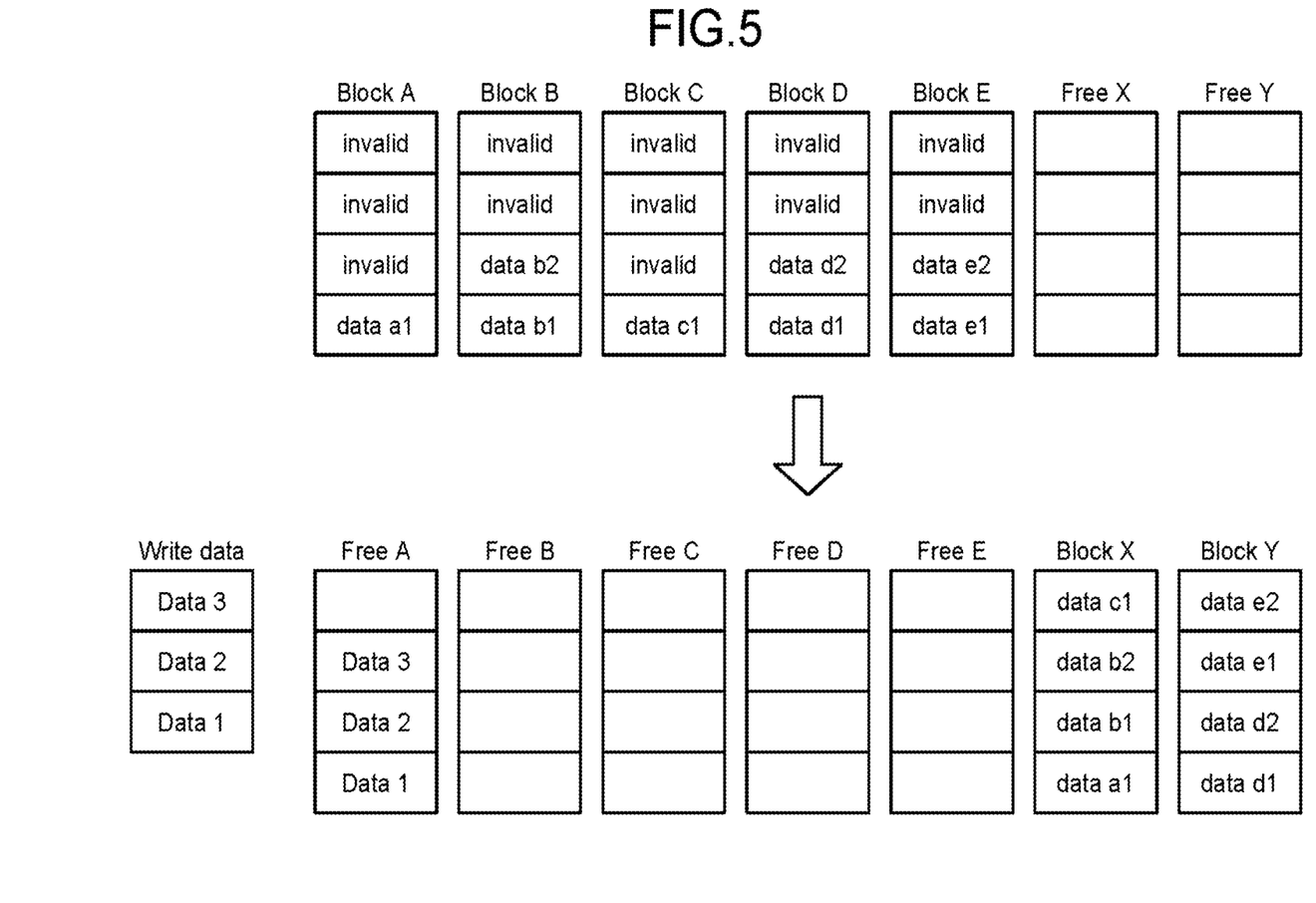
FIG. 5 is a diagram that illustrates an example of the operation sequence of normal garbage collection.

FIG. 5 is a diagram that illustrates a normal GC process. An upper diagram of FIG. 5 illustrates a state before execution of GC, and a lower diagram of FIG. 5 illustrates a state after the end of the GC. In the upper diagram of FIG. 5, Block A, Block B, Block C, Block D, and Block E that are active blocks are GC source blocks, and blocks Free X and Free Y that are free blocks are GC destination blocks. In FIG. 5, for the simplification of description, each block is assumed to be able to store data corresponding to four pages.

As illustrated in the upper diagram of FIG. 5, valid data a1 is stored in Block A, valid data b1 and valid data b2 are stored in Block B, valid data c1 is stored in Block C, valid data d1 and valid data d2 are stored in Block D, and valid data e1 and valid data e2 are stored in Block E. In the other pages of Block A to Block E, invalid data is stored. In the case illustrated in FIG. 5, a block in which there are two or less units of valid data inside the block is selected as a GC source block.

When the normal GC is executed, as illustrated in the lower diagram of FIG. 5, the data a1 of Block A, the data b1 and the data b2 of Block B, and the data c1 of Block C are moved to the free block Free X, and the data d1 and the data d2 of Block D and the data e1 and the data e2 of Block E are moved to the free block Free Y. As a result, the free blocks Free X and Free Y become active blocks Block X and Block Y. In addition, Blocks A to E that have been active blocks become free blocks Free A to Free E. In this way, the five free blocks Free A to Free E are generated. An erasing process is executed for the generated free blocks Free A to Free E. In accordance with this normal GC process, the management information 30b is updated. For example, in the logical/physical translation table, the correspondence relation between a physical address at which the data of the GC source is stored and the logical address is invalidated. In addition, the correspondence relation between a physical address at which the data of the GC destination is stored and the logical address is validated. Furthermore, in the block management table, the erase counts of blocks of which data is erased are updated, the GC source blocks are changed from active blocks to free blocks, and the GC destination blocks are changed from free blocks to active blocks. Thereafter, the GC control unit 25 transmits a response representing the end of the GC to the host 1 through the host I/F 3.

Data 1, Data 2, and Data 3 illustrated on the left side of the lower diagram illustrated in FIG. 5 represent write data specified by a write request transmitted from the host 1 after the end of the normal GC described above. Such Data 1, Data 2, and Data 3 are respectively stored in one of blocks Free A to Free E that are free blocks generated by the normal GC. In the lower diagram of FIG. 5, Data 1, Data 2, and Data 3 are stored in the free block Free A.

In a case where a GC execution request has not been received from the host 1 (Step S100 No), the GC control unit 25 determines whether or not a write request has been received from the host 1 (Step S120). In a case where a write request has not been received, the GC control unit 25 determines whether or not the number of free blocks is less than a threshold Th1. In a case the number of free blocks is secured to be the threshold Th1 or more (Step S130 No), the GC control unit 25 ends the process. On the other hand, in a case where the number of free blocks is less than the threshold Th1 (Step S130 Yes), the GC control unit 25 executes the normal GC described above (Step S110).

A case where GC is executed in a state in which a GC execution request has not been received corresponds to a case where the memory system independently executes the GC. The case where the memory system independently executes the GC includes a case where a write request is received and a case where a write request is not received. In the case where a write request is not received (Step S120 No), also in a case where the number of free blocks is less than the threshold Th1 (Step S130 Yes), urgent response is not necessary. For this reason, in such a case, the normal GC is executed. For example, at the time of executing the patrol read described above that is executed by the patrol read unit 24, data of which the number of error bits exceeds a threshold is set as a refreshing target. At the time of executing this refreshing process, in a case where free blocks that are data movement destinations are insufficient, the GC process is executed. When the GC process is activated according to such patrol read, an urgent response is not necessary, and accordingly, the GC control unit 25 executes the normal GC.

In addition, the memory system 100 executes wear leveling for leveling the degrees of wear of blocks. In the control of the wear leveling process, data of a block for which rewriting has not been executed for a long time and the number of times of rewriting is small is moved to a block for which the number of times of rewriting is large, and data of a block for which the number of times of rewriting is large is moved to a block for which the number of times of rewriting is small. When data is moved at the time of such wear leveling, in a case where free blocks that are data movement destinations are insufficient, the GC process is executed. Also when the GC is activated according to such wear leveling, the GC control unit 25 executes the normal GC.

When a GC execution request is not received from the host 1, in a case where a write request is received from the host 1, the command processing unit 21 determines whether or not the number of free blocks is less than a threshold Th2 (Step S140). Here, Th2<Th1. In a case where the number of free blocks is secured to be the threshold Th2 or more (Step S140 No), the command processing unit 21 executes a normal writing process in which received write data is written into a free block of the NAND 10 (Step S150). On the other hand, in a case where the number of free blocks is less than the threshold Th2 (Step S140 Yes), the command processing unit 21 notifies the GC control unit 25 of an urgent GC execution request. When the notification is received, the GC control unit 25 executes urgent GC (Step S160). It may be configured such that Th2 is equal to Th1. After the execution of the urgent GC, in order to secure free blocks as many as possible, it is preferable to execute the normal GC.

Figure 6:
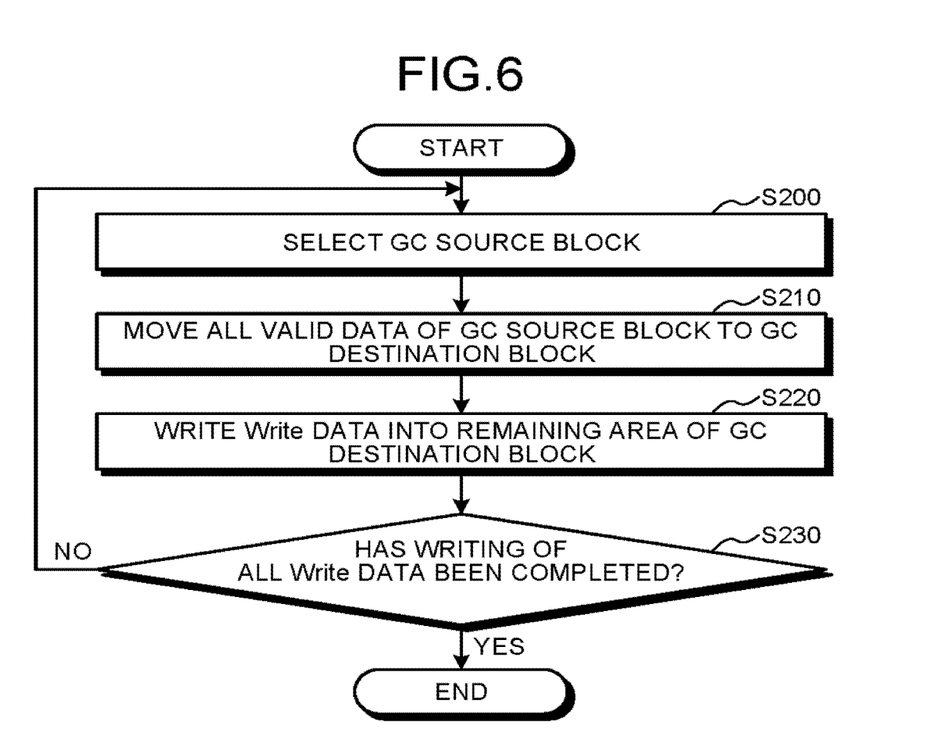
FIG. 6 is a diagram that illustrates an example of the operation sequence of urgent garbage collection.

FIG. 6 is a flowchart that illustrates an example of the urgent GC process. The GC control unit 25 selects a GC source block (Step S200). While a block having a low content ratio of valid data is selected as the GC source block in the normal GC, in the urgent GC, the content ratio of valid data is not set as a condition for the selection of the GC source block. In other words, in the urgent GC, not only a block having a low content ratio of valid data but also a block having a high content ratio of valid data (for example, valid data is stored in a half or more of the block) is selected as the GC source block.

When one GC source block is selected, the GC control unit 25 moves all the valid data stored in the selected block to an erased free block that is a GC destination (Step S210). In other words, the GC control unit 25 reads all the valid data stored in the selected block and writes the read data into an erased free block that is a GC destination. In a case where data stored in the free block that is the GC destination has not been erased, the GC control unit 25 erases the data stored in the free block that is the GC destination.

In addition, the GC control unit 25 writes write data specified by a write request from the host 1 into a remaining area, in which the valid data has not been written, inside the free block that is the GC destination (Step S220). In this way, all the valid data stored in one GC source block and the write data specified by the write request are written into the GC destination block. At this time point, the GC source block can be released so as to be a free block.

The GC control unit 25 determines whether or not the writing of all the write data specified by the write request has been completed (Step S230) and repeats the process of Steps S200 to S220 until the writing of all the write data is completed. When the writing of all the write data is completed, the GC control unit 25, as described above, updates the management information 30b and notifies the command processing unit 21 of the completion of the writing of the write data. When this notification is received, the command processing unit 21 notifies the host 1 of the end of the execution of the write request. In addition, as described above, thereafter, in order to secure free blocks as many as possible, the GC control unit 25 executes the normal GC.

Figure 7:
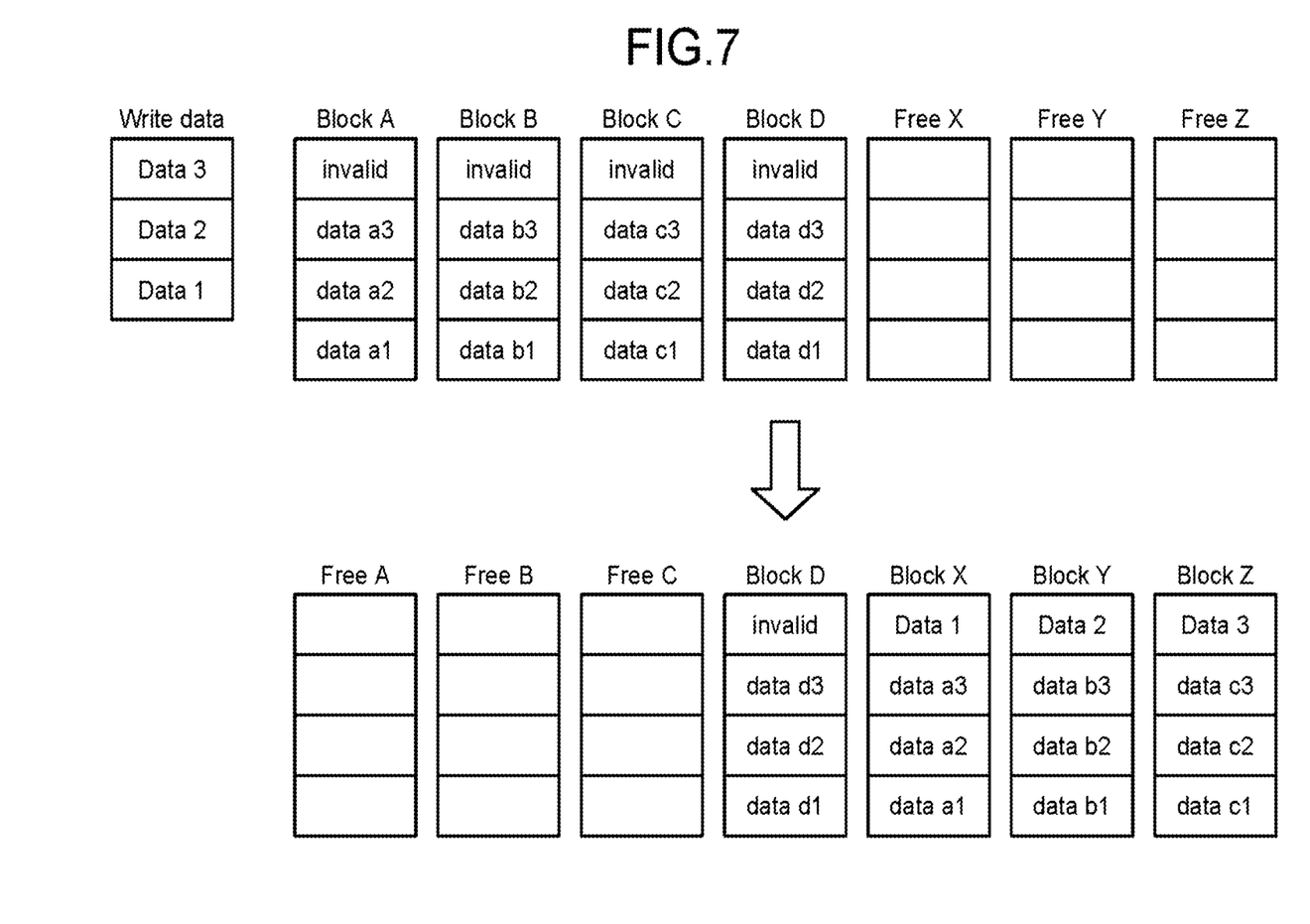
FIG. 7 is a diagram that illustrates an example of the operation sequence of urgent garbage collection.

FIG. 7 is a diagram that illustrates an urgent GC process. An upper diagram of FIG. 7 illustrates a state before the execution of the GC. A lower diagram of FIG. 7 illustrates a state after the end of the GC. In the upper diagram of FIG. 7, Block A, Block B, Block C, and Block D that are active blocks are GC source blocks, and blocks Free X, Free Y, and Free Z that are free blocks are GC destination blocks. Data 1, Data 2, and Data 3 that are illustrated on the left side of the upper diagram of FIG. 7 represent write data specified by a write request, which is a trigger for urgent GC, transmitted from the host 1. In the case illustrated in FIG. 7, for the simplification of description, each block is assumed to store data corresponding to four pages.

As illustrated in the upper diagram of FIG. 7, valid data a1, valid data a2, and valid data a3 are stored in Block A, valid data b1, valid data b2, and valid data b3 are stored in Block B, valid data c1, valid data c2, and valid data c3 are stored in Block C, valid data d1, valid data d2, and valid data d3 are stored in Block D. In the other pages of Blocks A to D, invalid data is stored. In the case illustrated in FIG. 7, valid data stored inside the block corresponds to three data units, and a block having a high content ratio of valid data is selected as a GC source block.

As illustrated in the upper diagram of FIG. 7, before the urgent GC is started, three free blocks Free X, Free Y, and Free Z are secured. When the urgent GC is started, as illustrated in the lower diagram of FIG. 7, first, the data a1, the data a2, and the data a3 that are all the data of Block A are moved to the free block Free X. In addition, the write data Data 1 is written into the remaining page of the free block Free X. At this time point, the free block Free X becomes the active block Block X, and Block A that has been an active block becomes a free block Free A. Accordingly, at this time point, three free blocks Free A, Free Y, and Free Z are secured.

Next, the data b1, the data b2, and data b3 that are all the data of Block B are moved to the free block Free Y. In addition, write data Data 2 is written into the remaining page of the free block Free Y. At this time point, the free block Free Y becomes an active block Block Y, and Block B that has been an active block becomes a free block Free B. Accordingly, at this time point, three free blocks Free A, Free B, and Free Z are secured.

Next, the data c1, the data c2, and data c3 that are all the data of Block C are moved to the free block Free Z. In addition, write data Data 3 is written into the remaining page of the free block Free Z. At this time point, the free block Free Z becomes an active block Block Z, and Block C that has been an active block becomes a free block Free C. Accordingly, at this time point, three free blocks Free A, Free B, and Free C are secured. For the generated free blocks Free A to Free C, thereafter, a data erasing process is executed at an appropriate time point.

In this way, in the embodiment, when a write request is received from the host 1, in a case where the number of free blocks is below the threshold Th2, the urgent GC in which all the valid data stored in one GC source block and write data specified by the write request are written into a GC destination block is executed, and accordingly, the GC process can be executed more quickly than the normal GC. In addition, the write data specified by the write request can be written while a constant number of free blocks are constantly secured.

In addition, as a writing destination block of write data at the time of reception of a write command from the host 1, in addition to an erased block, a block in which valid data is written in some pages of an erased block may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including a plurality of blocks; and
a controller configured to
upon detecting a number of free blocks among the plurality of blocks being less than a first threshold, execute a first processing, the first processing including reading valid data from a plurality of first blocks among the plurality of blocks and writing the read valid data into a first free block among the free blocks, the first block including valid data and invalid data, each of the free blocks not including valid data,
upon detecting the number of the free blocks being less than a second threshold, execute a second processing, the second processing including reading valid data included in one first second block among the plurality of blocks and writing the read valid data and at least a part of first data into a second free block among the free blocks, the second block including valid data and invalid data, the first data being write data specified by a first command, the first command being a write command received from a host, the second threshold being smaller than the first threshold.

2. The memory system according to claim 1, wherein the controller is configured to execute a third processing when a second command is received from the host, the second command including an instruction to execute a garbage collection, the third processing including reading valid data from a plurality of third blocks among the plurality of blocks and writing the read valid data into a third free block among the free blocks, the third blocks including valid data and invalid data.

3. The memory system according to claim 2, wherein the third processing includes erasing data of the plurality of the third blocks from which the valid data is read.

4. The memory system according to claim 2, wherein the controller executes the third processing after the execution of the second processing.

5. The memory system according to claim 2, wherein in the third processing, the controller preferentially selects, as the third block from the plurality of blocks, a fourth block rather than a fifth block, the fourth block including less valid data than the fifth block.

6. The memory system according to claim 1, wherein, when the first command and the first data are received from the host, and in a case where the number of the free blocks is more than the second threshold, the controller writes only the first data into the second free block.

7. The memory system according to claim 1, wherein, in a case where the number of the free blocks is less than a third threshold during execution of a fourth processing, the controller executes the first processing, the fourth processing including reading valid data stored in the nonvolatile memory and testing the read valid data.

8. The memory system according to claim 1, wherein, in a case where the number of the free blocks is two or more, the second processing includes writing the read valid data and at least a part of the first data into one second free block among the free blocks.

9. The memory system according to claim 1, wherein the second block includes more valid data than invalid data.

10. The memory system according to claim 1, wherein the nonvolatile memory is a NAND flash memory.

11. A method of controlling a nonvolatile memory including a plurality of blocks, the method comprising:
upon detecting a number of free blocks among the plurality of blocks being less than a first threshold, executing a first processing, the first processing including reading valid data from a plurality of first blocks among the plurality of blocks and writing the read valid data into a first free block among the free blocks, the first block including valid data and invalid data, each of the free blocks not including valid data,
upon detecting the number of the free blocks being less than a second threshold, executing a second processing, the second processing including reading valid data included in one first second block among the plurality of blocks and writing the read valid data and at least a part of first data into a second free block among the free blocks, the second block including valid data and invalid data, the first data being write data specified by a first command, the first command being a write command received from a host, the second threshold being smaller than the first threshold.

12. The method according to claim 11, further comprising executing a third processing when a second command is received from the host, the second command including an instruction to execute a garbage collection, the third processing including reading valid data from a plurality of third blocks among the plurality of blocks and writing the read valid data into a third free block among the free blocks, each of the third blocks including valid data and invalid data.

13. The method according to claim 12, wherein the third processing includes erasing data of the plurality of third blocks from which the valid data is read.

14. The method according to claim 12, further comprising executing the third processing after the execution of the second processing.

15. The method according to claim 12, further comprising in the third processing, preferentially selecting, as the third block from the plurality of blocks, a fourth block rather than a fifth block, the fourth block including less valid data than the fifth block.

16. The method according to claim 11, further comprising when the first command and the first data are received from the host, and in a case where the number of the free blocks is more than the second threshold, writing only the first data into the second free block.

17. The method according to claim 11, further comprising in a case where the number of the free blocks is less than a third threshold during execution of a fourth processing, executing the first processing, the fourth processing including reading valid data stored in the nonvolatile memory and testing the read valid data.

18. The method according to claim 11, wherein, in a case where the number of the free blocks is two or more, the second processing includes writing the read valid data and at least a part of the first data into one second free block among the free blocks.

19. The method according to claim 11,
wherein the second block includes more valid data than invalid data.

20. The method according to claim 11, wherein the nonvolatile memory is a NAND flash memory.

* * * * *